3,690,842
REACTOR FOR FLUIDIZED PARTICLES WITH ADJUSTABLE LEVEL WEIR TO PARTICLE OUTLET

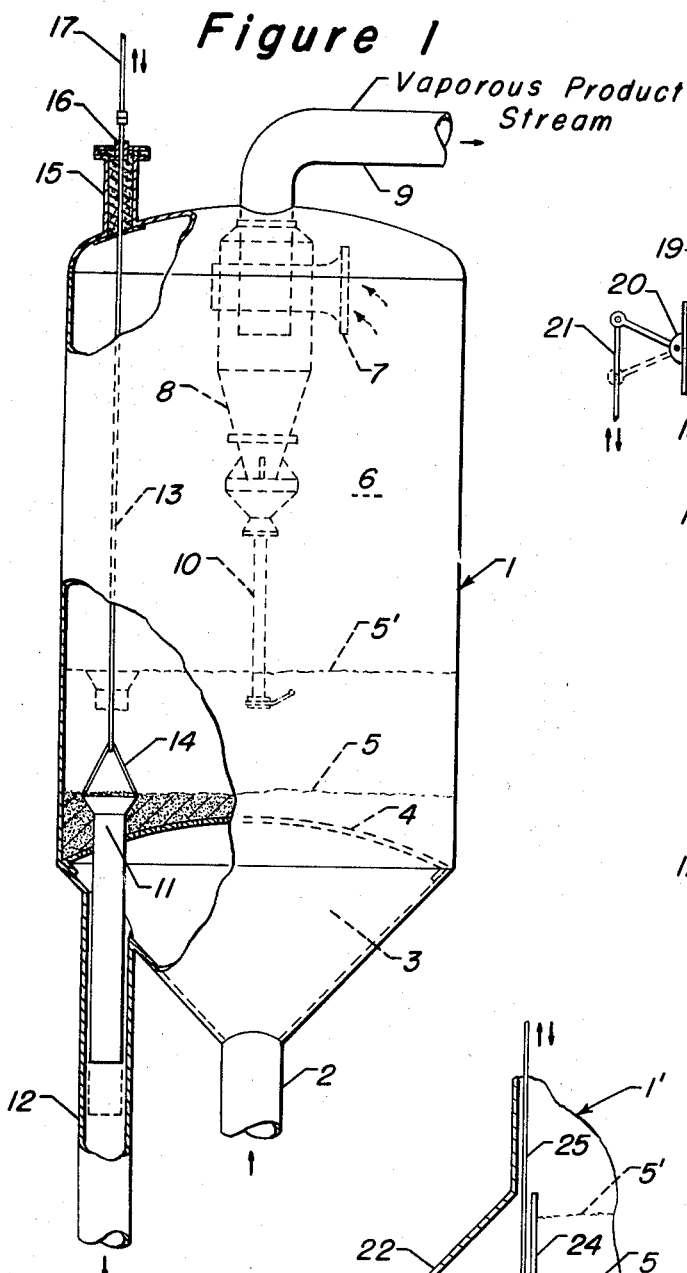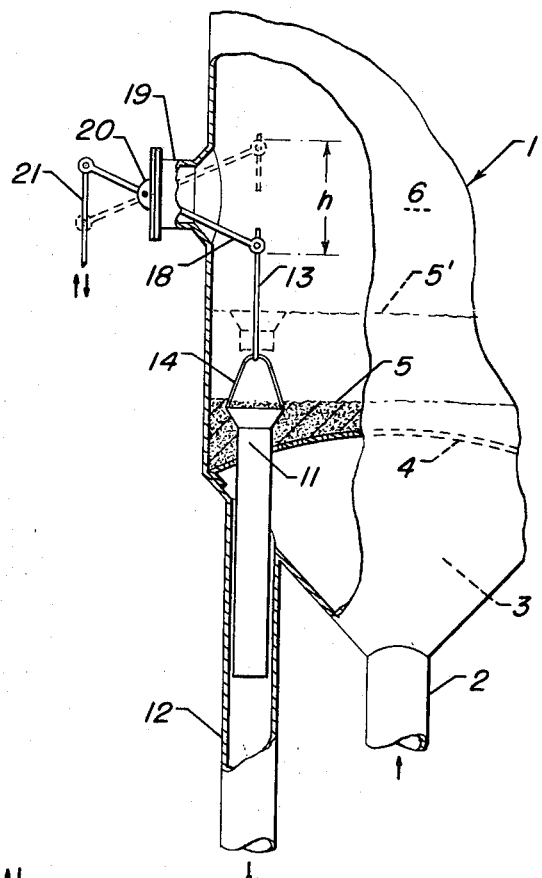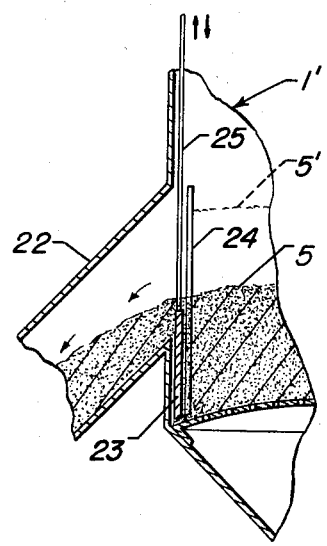
Figure 1
Figure 2
Figure 3
INVENTOR:
Lawrence S. Lockwood
BY:
ATTORNEYS

Lawrence S. Lockwood, La Grange, Ill., assignor to Universal Oil Products Company, Des Plaines, Ill.
Filed Oct. 5, 1970, Ser. No. 77,824
Int. Cl. B01j 9/00
U.S. Cl. 23—288 S                    5 Claims

ABSTRACT OF THE DISCLOSURE

A reactor chamber suitable for fluidized catalyst or other particulates which provides an adjustable height weir or opening to the particulate withdrawal means such as, for example, a vertically adjustable lift means connective with a slidable and open-topped conduit section as an upper part of the particulate withdrawal means from the chamber. Thus, varying levels of dense-phase particulate beds can be maintained in the chamber. The seal means around the lift means extending into the chamber for adjusting weir height is preferably provided at a zone that is somewhat removed from any high temperature areas within the chamber and away from the area of dense catalyst concentration.

---

This invention is directed to providing an adjustable height particle withdrawal opening, or variable level weir, for a reactor chamber accommodating fluidized particulates. More specifically, the invention may be considered to be directed to providing a reactor chamber for a fluidized catalyst system with a variable level weir means such that different levels for the dense-phase catalyst bed may be maintained to, in turn, effect different contact times with a vaporous charge stream or can insure a proper and desired circulation of catalyst into and through the reactor chamber.

By way of explanation, with respect to the operation of processing units carrying out the fluidized catalytic cracking of hydrocarbons there is a present trend toward the utilization of high activity cracking catalysts which require only short contact times with the gas oil charge streams. In other words, the hydrocarbon charge stream has contact and exposure to the heated subdivided catalyst from the regenerator zone primarily for just that period of time required to flow up through the riser tube or conduit to the reactor chamber. This fluidized contact time in the conduit to an elevated reactor chamber is frequently referred to as "riser cracking." However, in the event that it is desired to maintain a given height of fluidized dense-phase bed within the reactor chamber, then such bed height is obtainable or controllable by the height of the intake port, or weir height, leading into the contacted catalyst "downpipe" which carries the "used" catalyst in a fluidized hindered settling, gravity flow downwardly to a regenerator zone or to a regenerator riser line that in turn connects with the regeneration chamber.

In essence, it may be considered a principal object of the present invention to provide an adjustable level weir arrangement with respect to the particle outlet of a fluidized particle contact chamber such that there may be no level, a low level, or a given height dense-phase fluidized bed selectively maintained in the chamber during a given fluidized operation.

It may be considered a further object of the invention to provide for a relatively cool or remote placement of any seal means around the lift means to the adjustable weir to preclude the problems of maintaining a pressure seal in a high temperature zone of 800°–1100° F. Concurrently, the arrangement removes the seal means from the area of high catalyst concentration to reduce the possibility of restricting the movement of the weir.

In a broad aspect, the present invention provides in combination with a reactor chamber constructed to receive particulate transported thereto in a fluidized manner by a gaseous stream, and additionally having means to discharge a product stream overhead free of particulates as well as have a withdrawal means connective with a downpipe for effecting the removal of such particulates in a descending fluidized column thereof, the improved construction which comprises, a movable wall section slidably movable in a substantially vertical plane with respect to said downpipe providing an adjustable height opening leading to said downpipe, a vertically adjustable lift means connective with the top of said wall section and extending through said chamber, seal means around said lift means where the latter leaves said chamber, and power means connecting with said lift means exterior of the chamber, whereby there can be resulting adjustability for the height of said wall section.

While the present modifier reactor chamber is of particular advantage for use in connection with a fluidized catalytic cracking of hydrocarbons practiced in the petroleum industry for carrying out "fluidized catalytic cracking," it is to be noted that a reactor chamber of this type might well be used in other fluidized catalytic operations, as for example fluidized dehydrogenation, fluidized hydroforming, etc. Also, the apparatus might well be used for other than hydrocarbon conversions in the chemical industry and it is not intended to limit the present invention for use in any one process.

Typically, fluidized catalytic reactor chambers have a "dip-leg" or "downpipe" which is a catalyst withdrawal conduit that extends downwardly from a lower conical portion of the reactor chamber or from a lower side wall portion of the chamber. Actually, it is conventional to have the used catalyst withdrawal conduit or passageway from the reactor chamber pass through the lower conical section, or side wall section, and connect with the upper portion of a catalyst stripping section where there is countercurrent contact with steam or other inert stripping medium. There is then a discharge of stripped particles into a withdrawal conduit which is the dip-leg or downpipe heretofore described.

In those instances where the stripping section, or the downpipe, extends directly vertically downwardly from the interior of the reactor chamber, there may be a slidable weir or wall in the form of an open-topped conduit section connective with the top of the stripping section or the downpipe and an adjustable lifting means in turn connective with the top of the slidable section in order to adjust the level of the dense-phase bed in the lower portion of the reactor chamber. In other words, the height of the overflow into the open-topped conduit section will be the "weir height" and determine the top level of the dense-phase catalyst bed in the chamber in the same manner that a drain height or outlet height would effect a liquid level in a liquid-containing chamber. In connection with a side outlet opening or other side withdrawal arrangement, it is of advantage to utilize a non-circular slidable plate section, in the manner of a vertical movable weir, such that the height of the overflow of particulates from the dense-phase bed level will be over the top of the adjustable height wall, rather than be determined by the fixed position of the side outlet opening in the wall of the reactor chamber.

Various types of lift means may be utilized to effect the up and down adjustment of a weir plate or of an open-topped conduit type section; however, in a simplified arrangement, a suitable cable, chain, rod or the like may be attached to the movable weir section and arranged to extend through the top of the reactor chamber or, alternatively, it may connect with a movable arm means which, in turn, extends through the side wall portion of the chamber. In any event, that portion of the lift means which extends through the reactor chamber should be positioned so as to be set back and be somewhat remote from a high temperature portion of the chamber. Where desired, insulation or other heat resistant material can be packed or positioned around or alongside of the movable lift means extending into the reactor chamber so as to preclude a high temperature at the exterior seal means.

The actual lifting mechanism for adjusting the weir height may comprise a manually operated winch connective with the cable or chain means in turn connective with the lift portion for the weir that is within the reactor chamber. However, in a preferred arrangement, there will generally be a power operated motor or other power controlled mechanical lifting means that is readily started and stopped, or otherwise readily controllable, such that there may be an easy up and down automatic adjustment of weir height within the interior of the reactor chamber. For example, a pinion and rack arrangement connecting through a rod to the weir will provide a positive downward adjustment or closure, as well as provide a lift means.

Reference to the accompanying drawing and the following description thereof will serve to illustrate various embodiments of the present invention as well as point out advantageous features which may be obtained through the use of adjustable weir means in combination with the particle outlet means to thereby control dense-phase bed level within the particle containing chamber.

FIG. 1 of the drawing is an elevational view, partially in section, of a reactor chamber having a particle withdrawal passageway extending vertically downward from a lower portion of the chamber whereby there may be a movable open-topped conduit section within the upper portion of the withdrawal conduit.

FIG. 2 of the drawing is a partial sectional elevational view indicating a modified vertical height adjustment means for connection with the top portion of the slidable conduit section.

FIG. 3 of the drawing indicates, in a partial sectional view, the utilization of a vertical height weir plate in combination with a side positioned particle outlet passageway, whereby there may be a varying level dense-phase bed in the lower portion of the particular reactor chamber.

Referring now particularly to FIG. 1 of the drawing, there is shown diagrammatically a reactor chamber 1 which is of a type commonly used in connection with the fluidized catalytic cracking of a gas oil stream in a petroleum refinery so as to provide improved higher octane gasoline fractions. As indicated in the present embodiment, there is provision for a fluidized rising column of catalyst particles and vaporized hydrocarbons to be introduced upwardly through riser conduit 2 into the interior conical zone 3 from which there is distribution uniformly through perforated grid means 4 into the lower portion of the chamber 1. Typically, there is a relatively shallow or low height dense-phase bed 5 in the lower portion of the chamber and a superposed light phase catalyst zone 6 (in that there is a low density of particles with respect to vapor). The contacted or "cracked" hydrocarbon fractions, together with a certain amount of entrained catalyst particles, pass into inlet means 7 for centrifugal separator means 8 and a "cleaned" vapor stream is discharged by way of outlet means 9. Recovered particulates from separator 8 are permitted to pass by way of a depending dipleg 10 to the lower interior portion of the chamber.

Contacted or "used" catalyst particles continuously flow from the dense-phase bed 5 into the open-topped portion of conduit section 11 to, in turn, pass into the withdrawal passageway or conduit means 12. The latter will communicate with a stripper and/or a downpipe means which will transfer the withdrawn particles to a regeneration zone. In other words, a fluidized contacting chamber of the present type is used as part of a continuous operation where there is a constant introduction of hot catalyst particles from a regenerator with a vaporized charge stream and simultaneously there is a continuous withdrawal of contacted particles so that they may be passed back to the regeneration zone. In the latter, there is oxidation and removal of at least a major portion of the carbonaceous deposit, whereby the "reactivated" particles may be again returned to the reactor chamber for reuse. Inasmuch as the activity of a catalyst will vary with composition, method of preparation, etc., there is a need to have an accompanying variation in contact time between the catalyst and the charge stream. In other words, there may be a need to vary the height of the dense-phase bed 5 and increase the degree of contact time with the charge stream over that which was obtained in the riser line 2 carrying up to the reactor chamber 1. Conversely, there may be an occasion to decrease the bed level 5 to a relatively low point in chamber 1 so as to decrease the amount of contact time between the catalyst and vapor.

In any case, in accordance with the present embodiment of the invention, there is the means to adjust the height of conduit section 11 which is slidable within the upper portion of conduit means 12 such that the dense-phase bed level into open-topped section 11 may vary from 5 to 5', or vice versa. Typically, there is indicated an interior rod means 13 connective with a bail or other connector means 14 such that section 11 may be raised or lowered a given increment by virtue of such rod means 13 carrying through nozzle means 15 and seal means 16 to an exterior cable portion 17. The latter may pass over suitable pulleys or to gear box means and the like that in turn connects to manual or power operated rack and pinion means. Various types of power operated lift means are conventional equipment and it is not deemed necessary to have to show such types of equipment in the present drawing. As previously noted, a preferred arrangement utilizes an easily startable and stoppable power operated means for effecting the lifting of the rod means 13 and the slidable section 11 so as to obtain any given weir height particle bed height within the lower portion of chamber 1.

Inasmuch as the lower portion of sliding section 11 is within a catalyst withdrawal section 12, there is no need to have a particular seal means between the two sections to in any way preclude particle by-passing around an upper section to a lower section. However, at the upper end of the chamber 1 where rod means 13 passes through nozzle means 15, it is desirable that there be insulation within the latter and/or a remoteness for seal means 16 whereby conventional packing or a tight sleeve means may be used around the rod 13 and permit pressure retention within chamber 1. Normally, a fluid catalytic cracking system operates at a relatively low pressure so that any seal means at 16 will be concerned with precluding loss of pressure from the interior of the chamber 1 operating at about 10 to 20 p.s.i.g. Actual temperatures within the reactor chamber will generally be in the range of 800°–1000° F. such that seal means 16 must be positioned in a manner to be at a considerably lower temperature not more than about 200° to 300° F., whereby conventional packing and sleeve type sealing means can be utilized without damage.

In FIG. 2 of the drawing, there is indicated a modified arrangement to that shown in FIG. 1 to the extent that the rod means 13 from the top of conduit section 11 is connected to lever arm member 18 that extends through a side opening or nozzle means 19. As indicated, a pivot means 20 is provided for the arm means 18 such that the latter may move up and down through an adjustable height $h$ within the interior of chamber 1 and in turn provide for up and down movement and adjustment for section 11 within the outlet passageway section 12. Thus, there can be an adjustment of bed level 5 to a height 5' or to any intermediate level within chamber 1 in the same manner as indicated with respect to the arrangement of FIG. 1.

At the exterior end portion of movable rod member 18, there is shown a vertically movable rod or cable means 21 which in turn can connect to a rack, or other power operating means, as heretofore described in connection with FIG. 1, for regulating and controlling the desired height for the open-topped seal means 11. Again, it is pointed out that it is not determined necessary to illustrate the rack or motor means for accomplishing the movement of the rod 21 and the arm means 18.

In FIG. 3 of the drawing, there is indicated a chamber 1' with a side outlet conduit 22 for the withdrawal of used catalyst from the dense-phase bed 5 and transferring it into a stripping chamber and downpipe for return to a regeneration zone. Thus, in this instance, there is provided an embodiment where a vertical weir plate 23 within guide means 24 can be vertically adjusted by being lifted up and down through use of a rod means 25. In other words, where it is desired to have a higher bed level, such as 5', there will be a raising of the weir plate 23 to a given desired height that will cause particles to increase bed depth before they can overflow weir 23 into outlet 22.

The lifting of rod means 25 may be accomplished through an overhead rod means carrying through a nozzle and seal, as shown in FIG. 1, or alternatively, may be vertically adjusted by a pivoted arm means such as shown in connection with FIG. 2 of the drawing, where the arm means, in turn, extends through a side portion of the chamber.

In any case, it will be noted that various types and shapes of vertically adjustable weir means, as well as varying forms of lift members, may be utilized in connection with the particle contacting chamber, and it is not intended to limit the invention to any one form of movable member connecting with the particle withdrawing passageway means to result in the adjustment of bed level within the lower portion of the reactor chamber.

I claim as my invention:

1. In combination with a reactor chamber constructed to receive particulates transported thereto in a fluidized manner by a gaseous stream, and additionally having means to discharge a product stream overhead free of particulates and a particle outlet passageway connective with a downpipe for effecting the removal of such particulates in a descending fluidized column thereof, the improved construction which comprises, a movable wall section slidably movable in a substantially vertical plane with respect to said downpipe providing an adjustable height opening leading to said downpipe, a vertically adjustable lift means connective with the top of said wall section and extending through said chamber, seal means around said lift means where the latter leaves said chamber, and power means connecting with said lift means exterior of the chamber, whereby there can be resulting adjustability for the height of said wall section.

2. The improved reactor chamber of claim 1 further characterized in that said movable wall section comprises a circular open-topped conduit member slidably movable within said particle outlet passageway and said downpipe.

3. The improved reactor chamber of claim 1 further characterized in that said movable wall section comprises a plate member adapted to slide in a substantially vertical plane across an outlet passageway from a side portion of said chamber.

4. The improved reactor chamber of claim 1 further characterized in that said vertically adjustable lift means carries through an upper portion of said chamber providing a vertical lift means connective with said movable wall section extending throughout the substantially full height of the chamber.

5. The reactor chamber of claim 1 further characterized in that said vertically adjustable lift means connective with the top of said movable wall section includes a lift member connective with a vertically movable arm member extending through a side portion of said chamber.

References Cited

UNITED STATES PATENTS

| | | | |
|---|---|---|---|
| 2,439,582 | 4/1948 | Scheineman | 23—288 S |
| 2,503,788 | 4/1950 | White | 23—284 |
| 2,698,224 | 12/1954 | Brooke | 23—288 S |
| 2,740,698 | 4/1956 | Helwig | 23—1 F |
| 3,219,420 | 11/1965 | Dielenberg | 23—284 |

MORRIS O. WOLK, Primary Examiner

R. E. SERWIN, Assistant Examiner

U.S. Cl. X.R.

23—1 F, 284